US008464758B2

(12) United States Patent
Breunig et al.

(10) Patent No.: US 8,464,758 B2
(45) Date of Patent: Jun. 18, 2013

(54) VALVE SYSTEM

(75) Inventors: Alfred Breunig, Urspringen (DE); Josef Hessdoerfer, Retzbach (DE); Walter Kirsch, Frammersbach (DE)

(73) Assignee: Robert Bosch GmbH, Stuttgart (DE)

( * ) Notice: Subject to any disclaimer, the term of this patent is extended or adjusted under 35 U.S.C. 154(b) by 413 days.

(21) Appl. No.: 12/743,637

(22) PCT Filed: Nov. 8, 2008

(86) PCT No.: PCT/EP2008/009448

§ 371 (c)(1),
(2), (4) Date: May 19, 2010

(87) PCT Pub. No.: WO2009/068173

PCT Pub. Date: Jun. 4, 2009

(65) Prior Publication Data

US 2010/0269935 A1 Oct. 28, 2010

(30) Foreign Application Priority Data

Nov. 28, 2007 (DE) ......................... 10 2007 057 654
Feb. 8, 2008 (DE) ......................... 10 2008 008 092

(51) Int. Cl.
*F16K 11/07* (2006.01)
*F15B 11/08* (2006.01)
*F15B 13/04* (2006.01)

(52) U.S. Cl.
USPC ........................... 137/625.69; 91/436; 91/437

(58) Field of Classification Search
USPC ............. 137/625.69, 596.12, 596.14, 596.18, 137/596.2, 596, 625.66, 625.63; 91/436, 91/437
See application file for complete search history.

(56) References Cited

U.S. PATENT DOCUMENTS

| | | | | |
|---|---|---|---|---|
| 3,267,966 | A * | 8/1966 | Williams | 137/625.69 |
| 4,479,514 | A * | 10/1984 | Bennett | 137/625.63 |
| 5,862,831 | A * | 1/1999 | Chung et al. | 137/596.2 |
| 2004/0069359 | A1 * | 4/2004 | Buttner | 137/625.69 |
| 2005/0044849 | A1 | 3/2005 | Berthod et al. | |
| 2008/0116403 | A1 * | 5/2008 | Shelbourn et al. | 251/58 |

FOREIGN PATENT DOCUMENTS

| | | |
|---|---|---|
| DE | 196 08 758 | 9/1997 |
| DE | 103 36 684 | 3/2005 |
| DE | 10 2006 002 920 | 7/2007 |

OTHER PUBLICATIONS

"High Pressure Ludy, Load-Sensing Control Block . . . " Type M6-15, Mannesmann Rexroth, Jun. 2000 (With Eng. Translation).

* cited by examiner

*Primary Examiner* — John Rivell
*Assistant Examiner* — Michael R Reid
(74) *Attorney, Agent, or Firm* — Michael J. Striker

(57) ABSTRACT

The invention relates to a valve arrangement with a continuously variable directional control valve, wherein the valve slide thereof can be adjusted in the direction of five positions in order to control a user in two directions, to carry out a quick motion, to switch into a floating position or to close off the pressure means connection to the user (neutral position).

12 Claims, 7 Drawing Sheets

VALVE SYSTEM

CROSS-REFERENCE

The invention described and claimed hereinbelow is also described in PCT/EP2008/009448, filed on Nov. 8, 2008, DE 10 2007 057 654.6, filed on Nov. 28, 2007, and DE 10 2008 008 092.6, filed on Feb. 8, 2008. These German Patent Applications, whose subject matter is incorporated here by reference, provide the basis for a claim of priority of invention under 35 U.S.C. 119 (a)-(d).

BACKGROUND OF THE INVENTION

The present invention relates to a valve system.

A valve system of this type is used, e.g., to activate hydraulic consumers of a mobile working machine, such as a wheel loader, a bulldozer, a crawler dozer, a telescopic loader, or an underground loader.

Data sheet RD 64 284/06.00 from Mannesmann Rexroth AG describes an LUDV mobile control block, in which the pressure-medium supply to the consumers is controlled via sections of directional control valves, using one proportional directional valve in each case. It includes one speed part, which is formed by a metering orifice, and a direction part which determines the direction of flow of pressure medium to and from the consumer. An LUDV pressure compensator is assigned to the metering orifice. In a mobile control block of this type, a load-independent flow distribution (LUDV) is given for consumers that may be activated simultaneously. As stated in a highly simplified manner, in LUDV systems of this type, when the activated consumers are under-supplied, i.e., when a pump is unable to meet the desired demand for pressure medium, the pressure differences across all open metering orifices decrease, and therefore the quantities of pressure medium that flow to the activated consumers are reduced by the same proportion. In this manner, it is ensured that individual consumers are not brought to an unwanted standstill. The present invention is not limited to LUDV systems, however.

In the known solution, the proportional directional valve may be moved from a neutral or centered position into the direction of first positions, in which, e.g., a hydraulic cylinder is retracted. When displaced in the other direction, the hydraulic cylinder is extended. Furthermore, the directional-control valve section may be moved into a floating position by switching over a floating-position valve and simultaneously activating the valve spool in the "lower" direction; in the floating position, the two consumer ports and the pressure port are connected to the tank port, and therefore, e.g., a dozer blade of a crawler dozer lies on the ground simply under its own weight. The disadvantage of this solution is that a separate floating-position valve is required.

Publication DE 103 36 684 A1 shows a valve system in which the directional control valve is equipped with four positions (neutral position, raise, lower, floating position) of a valve spool. The term "position" is understood to mean a large number of intermediate positions, in each of which an opening cross section that is active in terms of the functions "neutral", "raise", "lower", and "floating position" may be changed.

DE 196 08 758 A1 discloses a solution, in the case of which a valve spool of the directional control valve may be displaced into five positions (floating position, lower, neutral position, vibration damping, and extend); in the "vibration damping" position, an annular chamber of the hydraulic cylinder that is active in the direction of retraction is connected to the tank.

In none of these solutions is it possible, by displacing the valve spool, to obtain a quick- action function in addition to the functions "neutral setting", "extend", "retract", and "floating position", in which the pressure medium, which has been displaced out of the contracting pressure chamber of the consumer, e.g., the annular chamber of a hydraulic cylinder, is added to the volumetric flow of pressure medium being supplied to the other pressure chamber of the consumer. To realize a quick-action function of this type in the known solutions, a separate valve device must be provided, via which, when the "quick-action" function is activated, the volumetric flow of pressure medium flowing out of the contracting pressure chamber circumvents the directional control valve and is added to the volumetric flow of pressure medium that is flowing to the pressure chamber which is expanding.

SUMMARY OF THE INVENTION

In contrast, the present invention is based on the object of creating a valve system in which quick-action operation and floating-position operation are made possible using a simple design.

According to the present invention, the valve system includes a proportional directional valve that has a valve spool that is guided in a valve bore, which may be moved out of a spring-preloaded neutral position and into a first direction, in which a pressure-medium flow path is controlled open between a consumer port and the inlet port, and between another consumer port and an outlet port. When the valve spool is displaced in the other direction, in a first position, a pressure-medium flow path is controlled open between the other consumer port and the inlet port, and between the aforementioned consumer port and the outlet port. Preferably, this is an "extension" position, in which pressure medium flows out of the pressure chamber—on the piston rod side—of a differential cylinder, and in which pressure medium flows into the pressure chamber on the side opposite the piston rod.

According to the present invention, when the valve spool is displaced further in the other direction, the volumetric flow of pressure medium flowing away from a consumer port is added to that volumetric flow of pressure medium that flows toward the other consumer port; the directional control valve is then in a quick-action position.

When the valve spool is moved past the quick-action position, the two consumer ports and the inlet port are connected to the outlet port, thereby displacing the directional control valve into the floating position.

As a result, the valve system according to the present invention is designed to include a directional control valve, the valve spool of which may be moved into five positions, the floating position being reached preferably after the quick-action position has been passed.

According to the concept according to the present invention, these functions are activated by adjusting the directional control valve, and so, in contrast to the state of the art described initially, no additional control valves, which must be switched manually or via precontrol, or the like need to be provided.

The concept according to the present invention may be used for LUDV directional control valves, and for IS directional control valves, in which the pressures in front of and behind a metering orifice act on a pressure compensator, and for directional control valves for throttle controls (6-way valves with circulatory channel).

In a preferred embodiment of the present invention, in the quick-action position of the directional control valve, a residual cross section in the pressure-medium flow path between the one consumer port and the outlet port is controlled open.

In a specific solution, the valve spool is provided with a control edge, using which, when displaced in the other direction, an opening cross section in the pressure-medium flow path between the one consumer port and the outlet port may be controlled open, and in which at least one control or extension groove is formed on the valve spool at a distance from this control edge, using which, upon displacement in the other direction, an opening cross section between the one consumer port and the outlet port may be controlled open, and using which this opening cross section may be controlled closed upon further displacement of the valve spool in the direction of the quick-action position. Upon further displacement in the direction of the floating position, the aforementioned opening cross section is controlled open using the control edge.

That is, using this extension groove, the pressure-medium connection of the one consumer port to the outlet port is initially controlled open. Upon further displacement in the direction of the quick-action position, this pressure-medium connection is closed, and it is opened once more when the valve spool is displaced in the direction of its end position, in order to set the floating function using the control edge.

The extension groove is particularly easy to create when it is designed as a pocket—which is closed around the circumference—on the outer circumference of the valve spool.

In a preferred embodiment of the present invention, a longitudinal groove that determines the aforementioned residual cross section is designed parallel—in terms of hydraulics—to the extension groove, and using which a residual cross section in the pressure-medium flow path from one consumer port to the outlet port is controlled open when the valve spool is displaced to the quick-action function. This longitudinal groove has a smaller effective cross section than the extension groove.

In one variant of the present invention, the valve spool is preloaded into its neutral position using a centering spring system. This centering spring system includes a pressure-point spring that becomes operatively engaged when the valve spool is displaced in the direction of the floating position, thereby ensuring that the operator must set this floating position deliberately, by overcoming a resistance.

A centering spring system of this type typically includes two centering springs that act on the valve spool in both directions; one of these centering springs bears against the pressure point spring that is acted upon by a greater preload, and therefore the pressure point spring is not compressed initially when the valve spool is displaced.

In a solution having a very simple design, the pressure point spring is held captive on a stop bolt that is preloaded against a stop that is secured in the housing, and against which the valve spool moves, directly or indirectly, upon displacement in the direction of the floating position, and so the preload of the pressure point spring must be overcome for displacement to continue.

The design of the valve system is particularly simple when a quick-action channel is provided, using which—when the valve spool is displaced into its quick-action position and the directional control valve is circumvented—a return line that is connected to the one consumer port is connected to an inlet line that is connected to the inlet port; a return valve that blocks in the direction toward the consumer port is provided in the quick-action channel. When the opening cross section between the one consumer port and the outlet port is controlled closed via the extension groove, the pressure medium may then flow from the consumer via the quick-action channel to the other pressure chamber, and therefore the consumer is moved at a high rate of speed.

The directional control valve of the valve system is preferably designed as an LUDV directional control valve having a direction part and a speed part, the later being formed by a metering orifice. Located downstream thereof is an individual pressure compensator which is acted upon by the highest load pressure of all activated consumers in order to reduce the pressure-scale opening cross section, and is acted upon by the pressure downstream of the metering orifice to enlarge the opening cross section.

BRIEF DESCRIPTION OF THE DRAWINGS

A preferred embodiment of the present invention is explained below in greater detail with reference to schematic drawings. In the drawings.

DETAILED DESCRIPTION OF THE PREFERRED EMBODIMENTS

Figure 1:
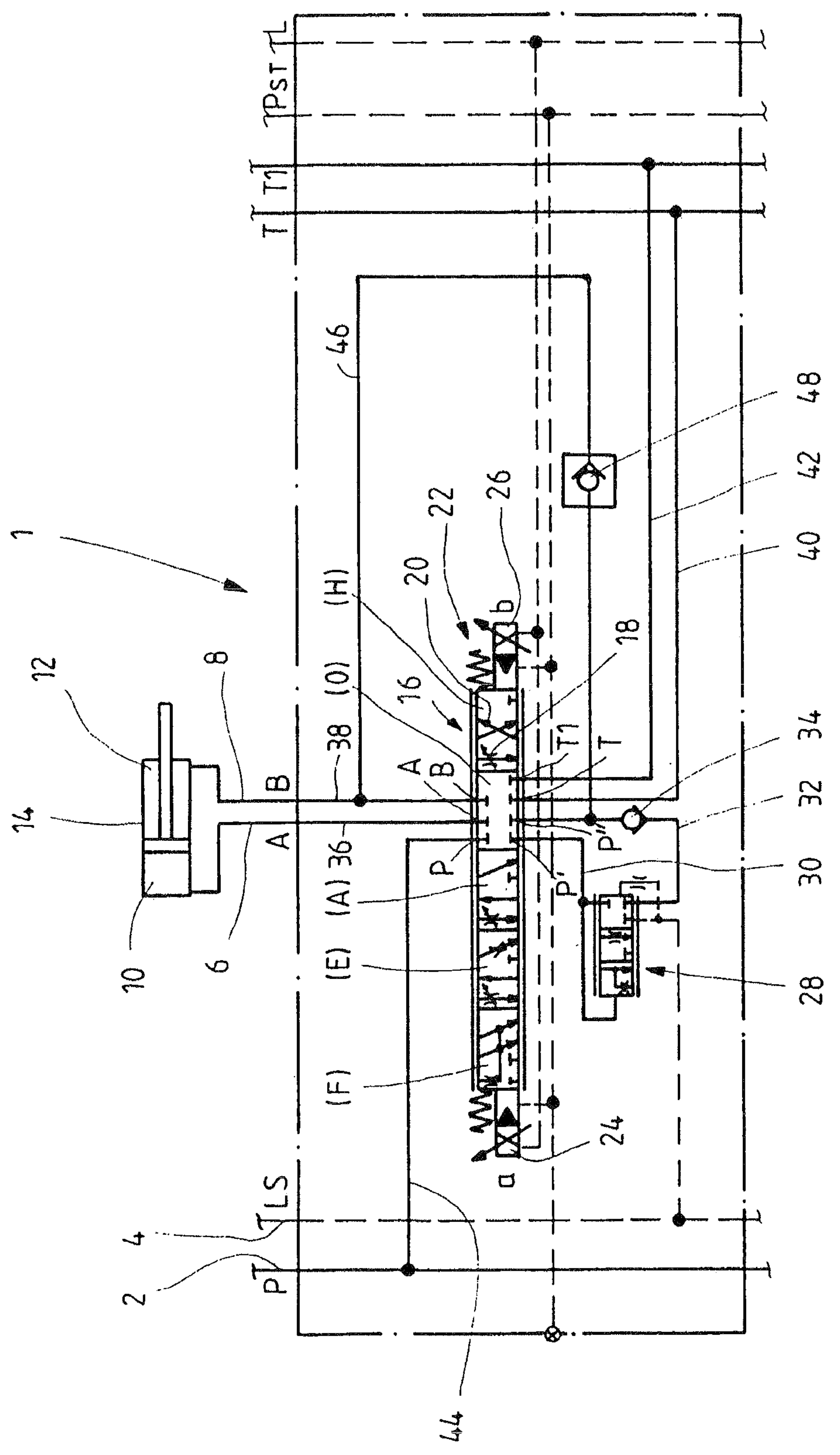
FIG. 1 shows a circuit diagram of a directional-control valve section of a mobile control block that includes a valve system according to the present invention.

FIG. 1 shows a circuit diagram of a directional-control valve section 1 of a mobile control block of a mobile working machine, e.g., a crawler dozer. A mobile control block of this type includes a large number of directional-control valve sections which may be used to activate the individual hydraulic consumers of the working machine. In the following embodiments, it is assumed that directional-control valve section 1, which is depicted in FIG. 1, is used to activate a lifting cylinder of a dozer blade in order to hold it in a predetermined position, lower or raise it, lower it quickly, or operate it in a floating position. In the depiction shown in FIG. 1, only those components of directional-control valve section 1 are shown that are essential to understanding the present invention. Further details are presented in the figures which are described below. The basic design of directional-control valve section 1 is known from aforementioned data sheet RD 64 284/06.00, and so only those elements that are essential to understanding the present invention will be described here.

As shown in the circuit diagram in FIG. 1, directional-control valve section 1 includes a pressure port P, two working ports A, B, tank ports T1 T, a control port pst, and a control oil outlet port L. Pressure port P is connected to a pump line 2 that is connected to the pressure port of a not-depicted pump which is activated via an LS pump regulator as a function of the highest load pressure of all activated consumers in the working machine. This load pressure is tapped by the consumers via the LS port and a load-sensing channel 4. The pumped quantity is adjusted via this pump regulator in a manner such that the pump pressure lies above the highest load pressure by a predetermined differential pressure.

Consumer ports A, B of the directional-control valve section are connected via consumer lines 6, 8 to a cylindrical chamber 10 on the bottom side, and to an annular chamber 12, which is situated on the piston-rod side, of a hydraulic cylinder 14. The direction of motion and the speed of hydraulic cylinder 14 are adjusted via a proportional directional valve 16. It is provided with a speed part, which is formed by a metering orifice 18, and a direction part 20; the pressure-medium volumetric flow to hydraulic cylinder 14 is determined via metering orifice 18, and the direction of flow to or from pressure chambers 10, 12 is determined via direction part 20.

According to the present invention, directional control valve 16 is provided with five settings, and a valve spool, which is described in greater detail below, is preloaded via a centering spring system 22 in a neutral position (0) in which the aforementioned ports are blocked. The valve spool is displaced using precontrol valves 24, 26, which are designed, e.g., as pressure control valves, the pressure port of which is connected to control line pst, the tank port of which is connected to L, and the control output of which is connected to a control chamber on the valve spool.

When the valve spool is moved to the right (as indicated in FIG. 1), the valve spool is first brought into the positions “extend”, which are labelled (A), in which hydraulic cylinder 14 extends and the dozer blade is lowered. When the valve spool is displaced further toward the right, the positions labelled (E) are reached, in which hydraulic cylinder 14 is operated using quick action. In this quick-action function, the volumetric flow of pressure medium from contracting annular chamber 12 is added to the volumetric flow of pressure medium being supplied to cylindrical chamber 10 via metering orifice 18. By displacing the valve spool in the direction of its positions labelled (F), a floating position is attained, in which the dozer blade rests on the ground under its own weight and may follow uneven terrain.

When the valve spool is moved out of the neutral position (0) and in the opposite direction, i.e., to the left in FIG. 1, the valve spool settings labelled (H) are reached, in which hydraulic cylinder 14 is retracted and the dozer blade is lifted.

In the embodiment shown, an individual pressure compensator 28 is located downstream of metering orifice 18, which is acted upon by the pressure in load-sensing channel 4, i.e., by a control pressure that corresponds to the highest load pressure, in order to reduce the flow area, and it is acted upon by the pressure downstream of metering orifice 18 to increase the flow area.

The inlet port of individual pressure compensator 28 is connected via a pressure compensator channel 30 to a pressure port P', and the outlet port of the pressure compensator channel is connected via a curved channel 32 to port P" of directional control valve 16. A load-holding valve 34 is located in curved channel 32 to support the load in a zero-leakage manner. A working port A of directional control valve 16 is connected via a forward-flow channel 36 to consumer port A, and consumer port B of directional control valve section 1 is connected via a return channel 38 to working port B of directional control valve 16. Tank ports T, T1 of directional control valve 16 are connected via outlet channels 40, 42, respectively, to tank ports T, T1 of directional-control valve section 1. Pressure port P of directional control valve 16 is connected via an inlet channel 44 to pressure port P of directional-control valve section 1.

As shown in FIG. 1, return channel 38 is connected via a quick-action channel 46 to the section of curved channel 32 that lies between pressure port P" and load-holding valve 34. A return valve 48 which opens in the direction toward pressure port P" is provided in quick-action channel 46. When the valve spool is moved into the “quick action” position (E), pressure medium that is displaced from annular chamber 12 may flow via quick-action channel 46 and return valve 48, which is opening, toward port P" of directional control valve 16, and therefore this outflowing volumetric flow of pressure medium is added to the volumetric flow of pressure medium that is flowing from metering orifice 18 to cylindrical chamber 10.

As likewise indicated in FIG. 1, in the case in which the pressure downstream of metering orifice 18 is greater than the pressure in load-sensing channel 4 in that instant, the pressure-compensator sliding element is moved to its left end position, as shown in FIG. 1, and therefore this pressure, which is present downstream of metering orifice 18, is signaled in load-sensing channel 4.

Figure 2:
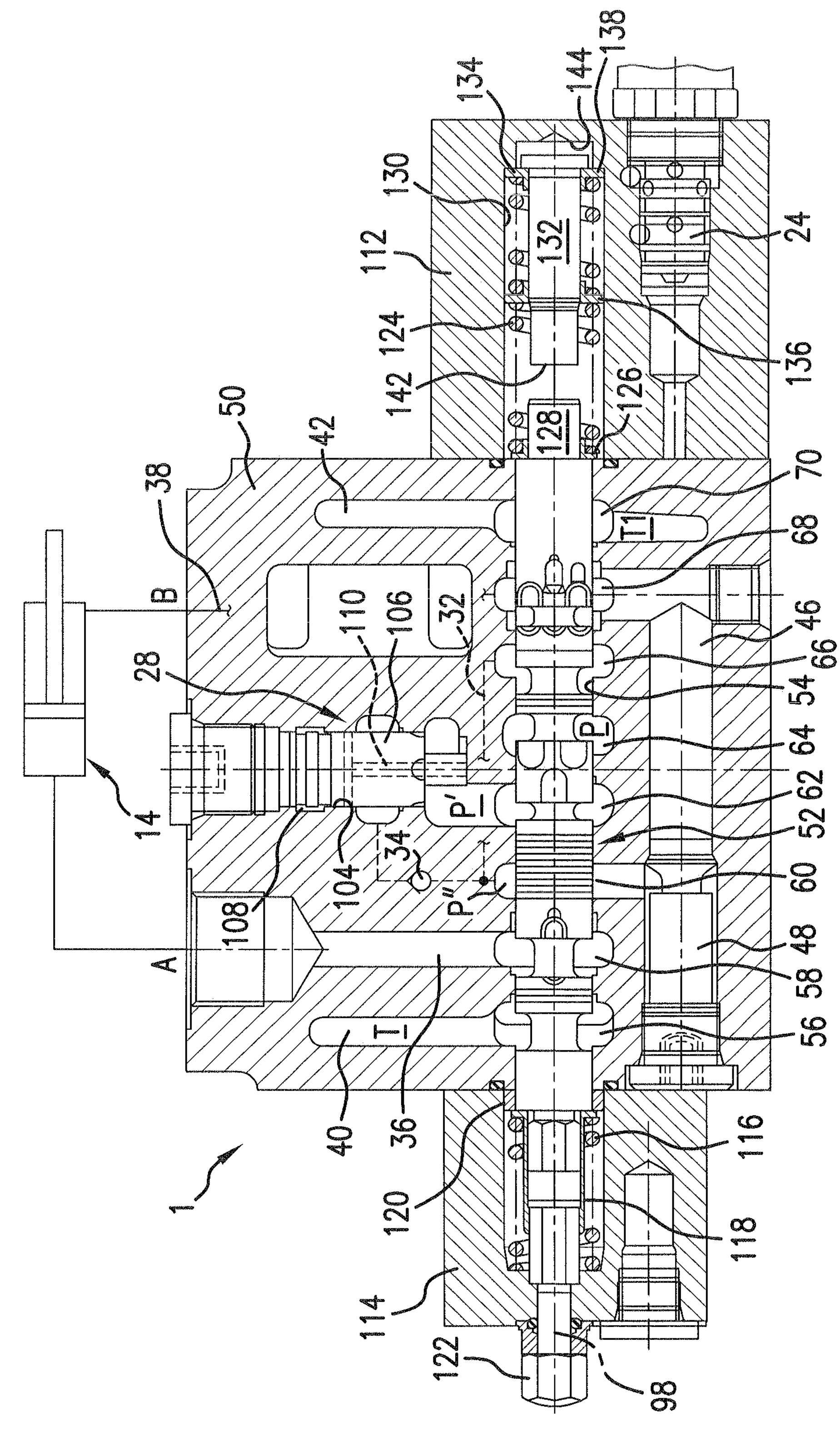
FIG. 2 shows a specific design of the directional-control valve section depicted in FIG. 1, in a sectional view.

FIG. 2 shows a specific embodiment of directional-control valve section 1 depicted in FIG. 1, in a sectional view. As mentioned, directional-control valve section 1 is part of a mobile control block that is formed of a large number of directional-control valve sections of this type, and of an input element and an end plate. Directional-control valve section 1 includes a valve disc 50, in which a valve bore 54 that accommodates valve spool 52 is formed. As shown in FIG. 2 and in the enlarged depiction in FIG. 3, valve bore 54 expands to include, as viewed from left to right, a tank chamber 56, a forward-flow channel 58, a pressure-compensator outlet chamber 60, a pressure-compensator inlet chamber 62, an inlet chamber 64, a further pressure-compensator outlet chamber 66, a return chamber 68, and a further tank chamber 70. The expressions “forward-flow . . . ”, “return . . . ”, etc. are selected merely to simplify the description; depending on the switching position of directional control valve 16, return chamber 68 may also lie in the forward flow, for example. As indicated in FIG. 2, tank chamber 56 is connected via outlet channel 40 to tank port T, forward-flow chamber 58 is connected via forward-flow channel 36 to consumer port A, and pressure-compensator outlet chamber 60 is connected via quick-action channel 46 and return valve 48 to return chamber 68; in the embodiment shown in FIG. 1, pressure-compensator outlet chamber 60 corresponds to port P". Return chamber 68 is connected via return channel 38 shown in FIG. 2 to consumer port B. Finally, tank chamber 70 has a pressure-medium connection via outlet channel 42 to tank port T1.

Figure 3:
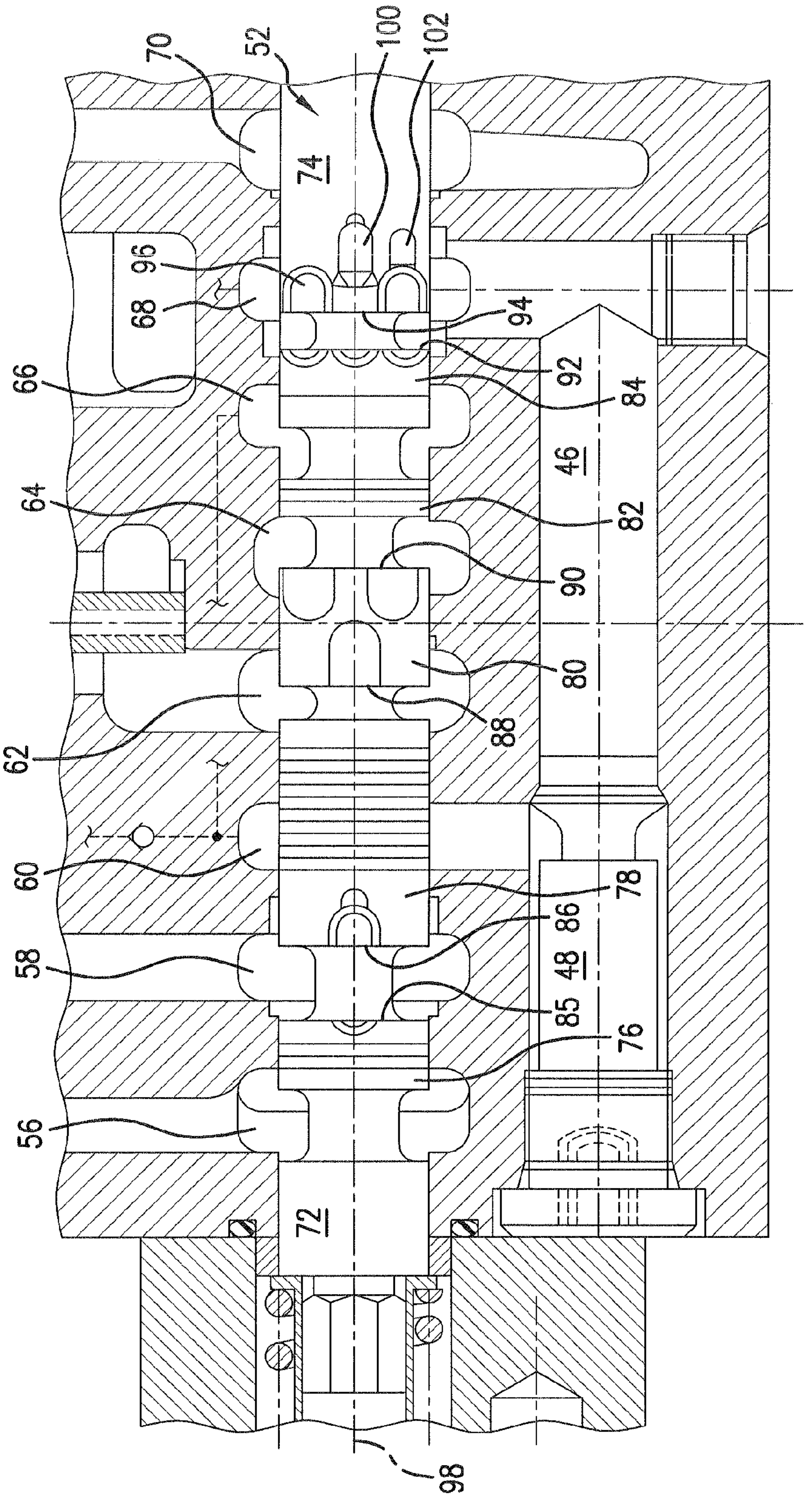
FIG. 3 shows an enlarged view of a directional control valve of the directional-control valve section depicted in FIG. 2, and FIGS. 4*a* through 4*d* show the directional-control valve section depicted in FIG. 2, in the positions "retract", "extend", "quick-action", and "float".

The design of valve spool 52 will be described with reference to the enlarged depiction in FIG. 3. As shown in FIG. 3, valve spool 52 is subdivided via a plurality of interspaced annular grooves into two end collars 72, 74, a tank control collar 76, an inlet collar 78, a control collar 80 that determines the opening cross section of metering orifice 18, an intermediate collar 82, and an inlet collar 84. A tank control edge 85 is formed on tank control collar 76, an inlet control edge 86 is formed on inlet collar 78, a metering-orifice control edge 88, 90 is formed on each end face of control collar 80, an inlet control edge 92 is formed on inlet collar 84, and a floating-position control edge 94 is formed on the opposite annular end face of end collar 74.

Aforementioned control edges 85, 86, 88, 90, 92, 94 are each provided with control grooves or control windows 96 in known manner; only one of the control windows that is assigned to floating-position control edge 94 is provided with a reference numeral, as an example, in FIG. 3.

At a distance from control windows 96 of floating-position control edge 94, an extension groove 100, which extends parallel to directional-control valve axis 98, is formed on the outer circumference of valve spool 52, the right—as shown in FIG. 3—end section of which is covered, in the neutral position (0), by the annular segment between control chambers 68, 70. The left—as shown in FIG. 3—end section of extension groove 100 is not connected to adjacent control windows 96, and therefore extension groove 100 is formed as a pocket that is closed around the circumference.

Situated parallel to and at a distance from extension groove 100, a longitudinal groove 102 is formed on the outer circumference of end collar 74, the width (as viewed in the circumferential direction) and length (as viewed in the axial direction) of which are less than those of extension groove 100. As shown in FIG. 3, longitudinal groove 102 leads into lower control window 96 of floating-position control edge 94. In the neutral position (0) shown, longitudinal groove 102 is open toward return chamber 68. As shown in FIG. 2, return chamber 68 is connected via quick-action channel 46, which is designed as an angled bore, and return valve 48 inserted therein, to pressure-compensation outlet chamber 60; the return valve opens toward pressure-compensation outlet chamber 60.

In the neutral position (0) of valve spool 52 shown in FIGS. 1 through 3, ports P, A, B, P', P'', T, T1 of directional control valve 16, which are visible in FIG. 1, are blocked. Accordingly, as shown in FIG. 3, the pressure-medium connection between chambers 56, 58 is blocked via tank control edge 85, the pressure-medium connection between chambers 58, 60 is blocked via inlet control edge 86, the pressure-medium connection between chambers 64 and 62 is blocked via metering-orifice control edges 88, 90, the pressure-medium connection between chambers 66, 68 is blocked via inlet control edge 92, and pressure-medium connection between chambers 70, 68 is blocked via extension groove 100, and therefore the consumer is fixed in its position shown.

Individual pressure compensator 28 shown in FIG. 1 has been inserted into a pressure-compensator bore 104 that extends perpendicularly to directional-control valve axis 98; a pressure-compensator piston 106 is acted upon on the end face, i.e., from the bottom to the top as shown in FIG. 2, by the pressure in pressure-compensator inlet chamber 62, and it is acted upon on the back side by the highest load pressure tapped in load-sensing channel 4, which is present in a rear annular chamber 108 of pressure-compensator bore 104. When the pressure-compensator cross section is controlled fully open (pressure-compensator piston 106 is displaced upwardly in the figure), the pressure in pressure-compensator inlet chamber 62 is signaled via inner bores 110 in pressure-compensator piston 106 into annular chamber 108 and, therefore, into load-sensing channel 4.

Centering spring system 22 shown in FIG. 1 is accommodated, as shown in FIG. 2, in spring housings 112, 114, into which the two end sections of valve spool 52 extend. In the left—as shown in FIG. 2—spring housing 115, a centering spring 116 is supported, and acts via a spring bushing 118 on the adjacent end face of valve spool 52; the displacement of spring bushing 118 to the right—as shown in FIG. 2—is limited by a stop 120 that is secured in the housing. The displacement of valve spool 52 to the left—as shown in FIG. 2—is limited by a displacement-limiting element 122.

A centering spring 124 is likewise supported in right spring housing 112, and acts via a spring plate 126 on an annular end face of valve spool 52 that enters centering spring 124 via a radially recessed end section 128.

A pressure-point spring 130 is provided, approximately in the extension of centering spring 124, in spring housing 112; pressure-point spring 130 is fixed on a stop bolt 132 between a stop ring 134 and a support ring 136 of stop bolt 132. Rings 134, 136 bear against stop bolt 132 in opposite directions. Centering spring 124 bears against support ring 136, and the spring preload of pressure point spring 130 is greater than that of centering spring 124. In the neutral position shown, stop bolt 132 is preloaded via centering spring 124 via its stop ring 134 against a stop 138 in the spring housing; spring plate 126 bears against a stop in the housing. In neutral position (0) shown, a left—as shown in FIG. 2—end face 142 of stop bolt 132 is located with axial clearance from the adjacent end face of end section 128 of valve spool 52. When the valve spool is moved to the right, end section 128 moves toward end face 142 of stop bolt 132, which is then moved along—while the pressure point spring is shortened—to an end stop 144 of spring housing 112.

Pressure control valve 24, which is used to activate the directional control valve, is also apparent on the directional-control valve section shown in FIG. 2.

The function of aforementioned directional-control valve section 1 will be explained with reference to FIG. 4, in which positions (A), (E), (F) and (H) per FIG. 1 are shown.

Figure 4A:
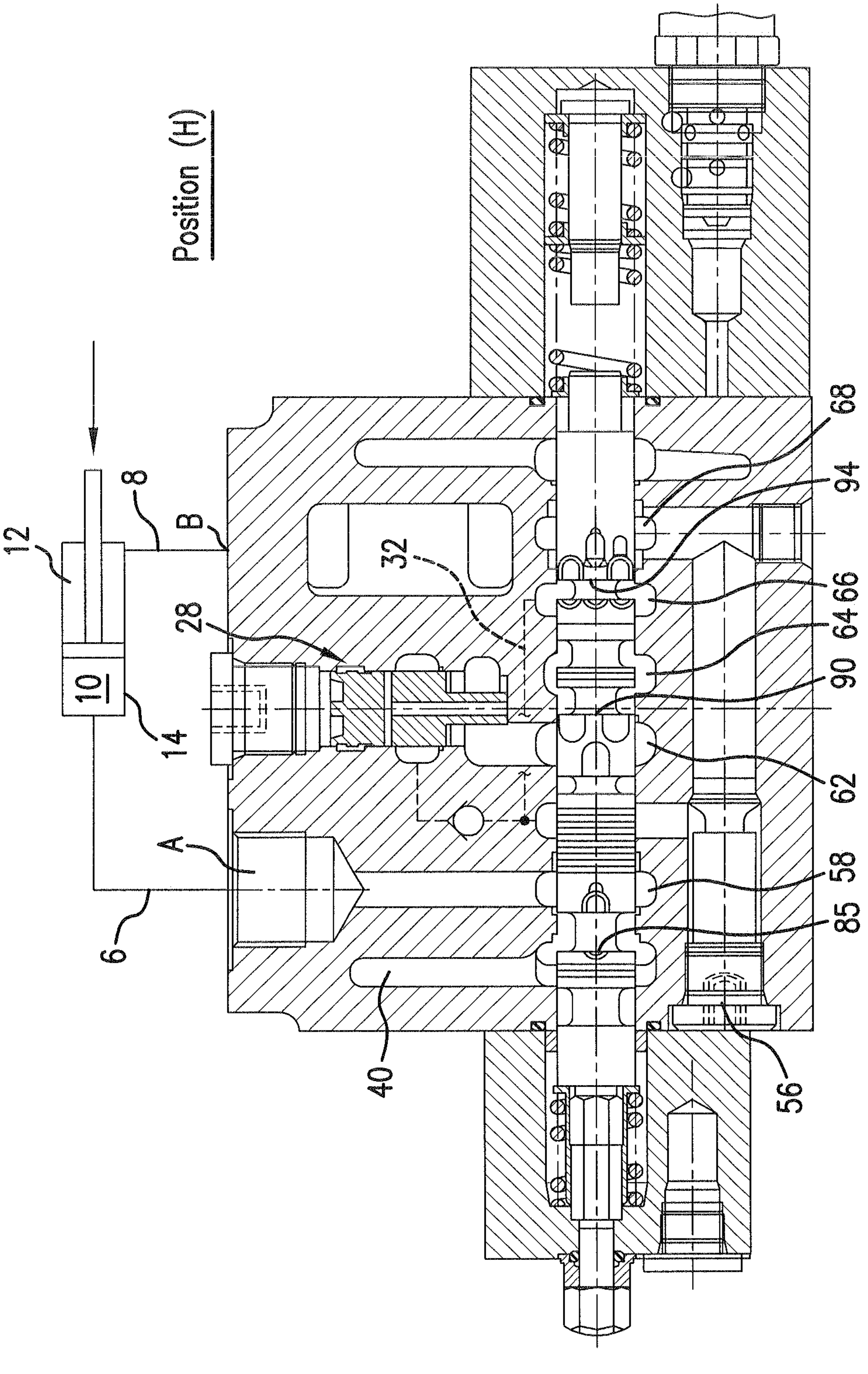

In the illustration shown in FIG. 4*a*, valve spool 52 is displaced, by setting a suitable control pressure, to the left via pressure-control valve 26 into its positions labelled (H), in which a pressure-medium connection between inlet chamber 64 and pressure-compensator inlet chamber 62 is controlled open via metering-orifice control edge 90; this controlled-open cross section forms the flow area of metering orifice 18. The pressure medium may then flow, via individual pressure compensator 28 and curved channel 32 to pressure-compensator outlet chamber 66, and, from there, enters return chamber 68 via the cross section that was controlled open by floating-position control edge 94; from return chamber 68, it flows to consumer port B and, from there, via consumer line 8 to annular chamber 12 of lifting cylinder 14. The pressure medium that is displaced out of contracting cylindrical chamber 10 enters—via consumer line 6, consumer port A, forward-flow channel 36, which now functions practically as a return channel—forward-flow chamber 58 which is connected via tank control edge 85 to tank chamber 56, and therefore the pressure medium flows via outlet channel 40 and tank port T of directional-control valve section 1 to tank. That is, when valve spool 52 is moved into positions (H), lifting cylinder 14 is retracted, and the dozer blade is therefore raised.

Figure 4B:
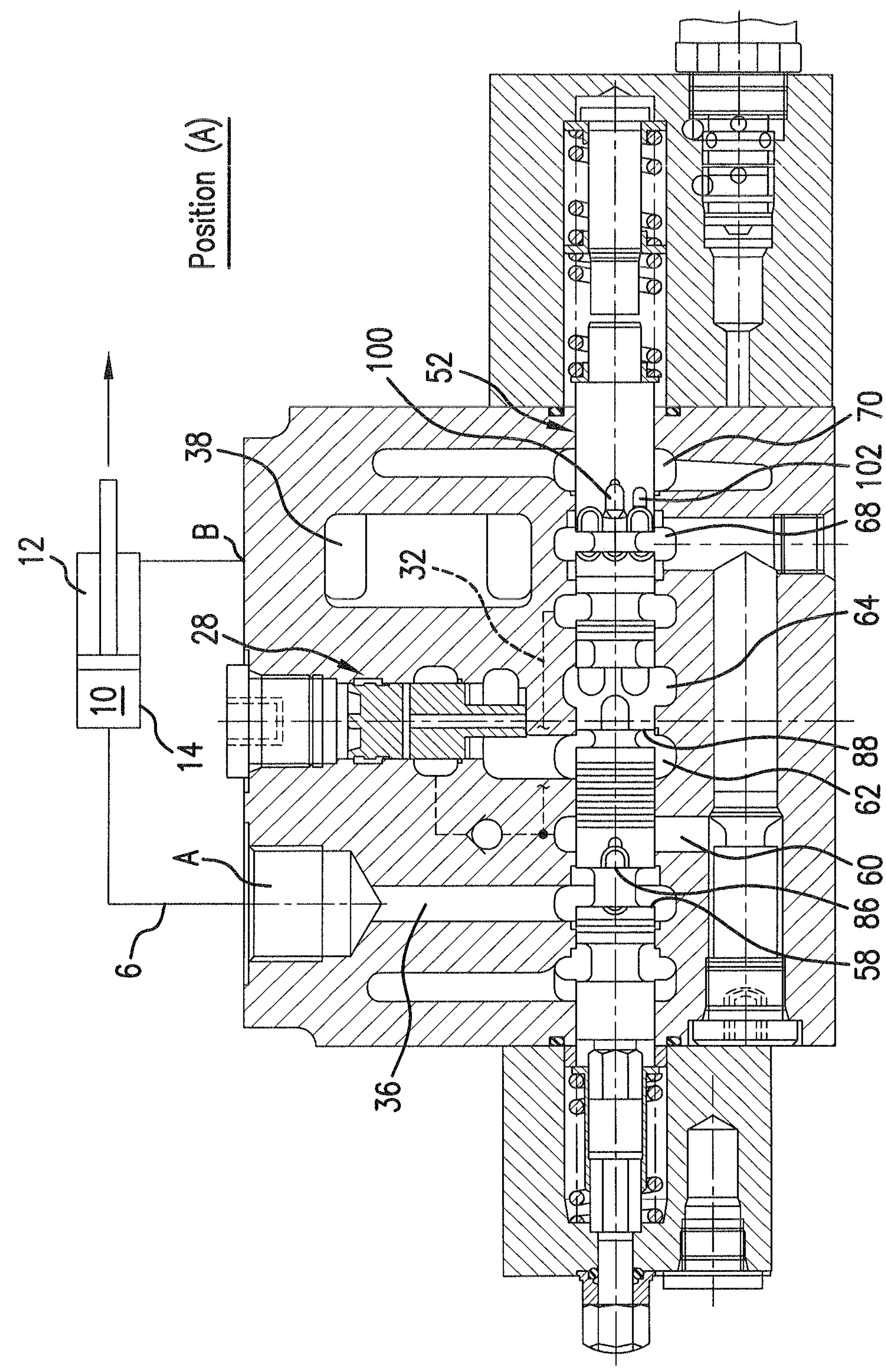

To lower the dozer blade, directional valve spool 52 as shown in FIG. 4*b* is moved to the right by setting a suitable control pressure via precontrol valve 24, as shown in the illustrations in FIGS. 1 through 3; the opening cross section of metering orifice 18 between inlet chamber 64 and pressure-compensator inlet chamber 62 is then determined via metering-orifice control edge 88. The pressure medium that flows away from individual pressure compensator 28 flows via curved channel 32 into pressure-compensator outlet chamber 60 and, from there, through the cross section, which was controlled open via inlet control edge 86, into inlet chamber 58, and then via forward-flow channel 36, consumer port A, and consumer line 6 into cylindrical chamber 10. The pressure medium that is displaced from annular chamber 12 flows via consumer port B, return channel 38, return chamber 68, and then via the cross section that was controlled open via extension groove 100 into tank chamber 70 and, from there, to the tank. Parallel to the opening cross section, which is determined by extension groove 100, an opening cross section between chambers 68, 70 is likewise opened, via small longitudinal groove 102.

As a result, when the valve spool is in positions (A), lifting cylinder 14 is extended in order to lower the dozer blade.

Figure 4C:
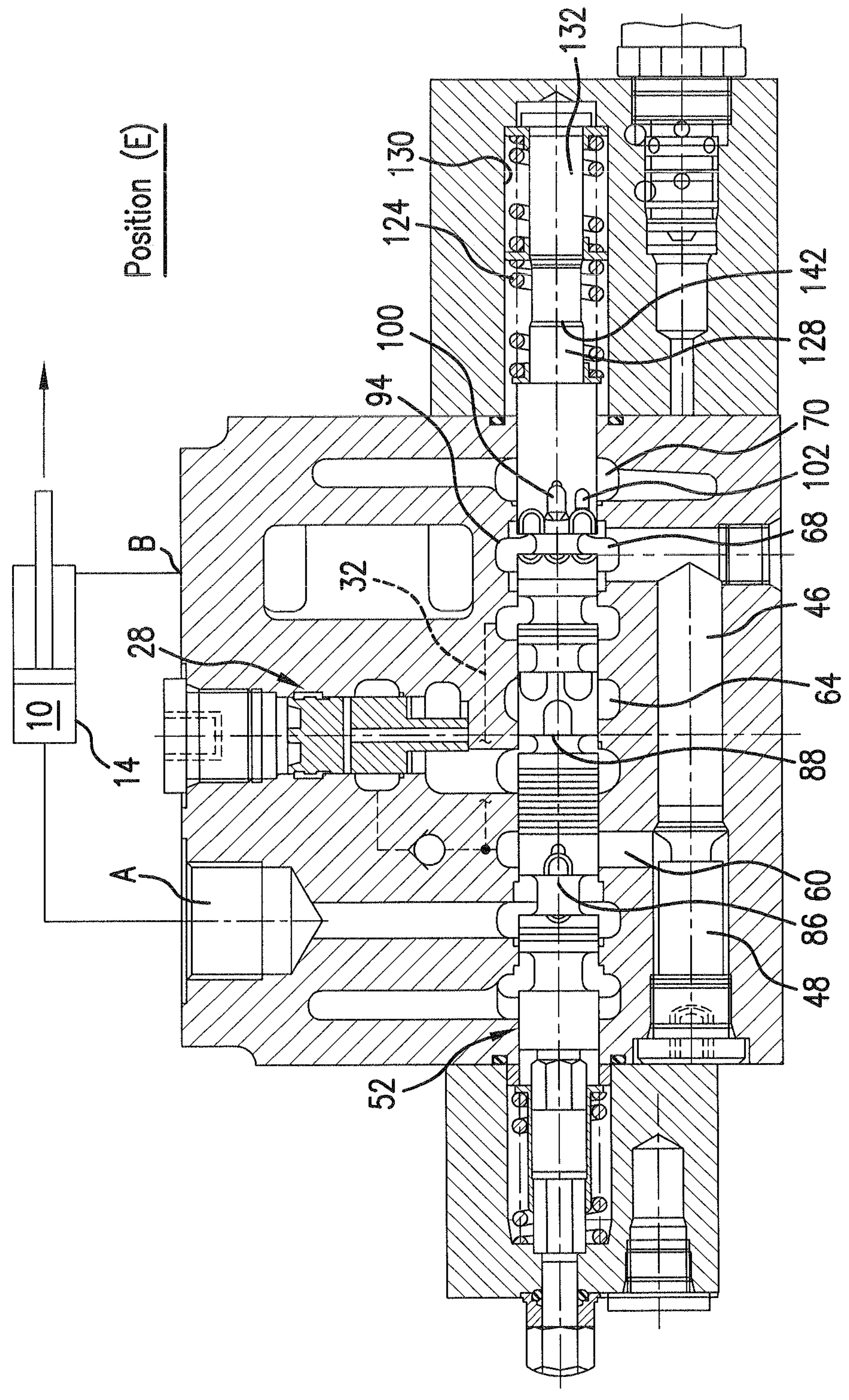

When valve spool 52 is displaced further to the right—as shown in FIG. 4*c*—into the quick-action positions labelled (E) in FIG. 1, the left—as shown in FIG. 4*c*—end section of extension groove 100 overlaps the annular segment between chambers 68, 70, and therefore the pressure-medium connection is blocked via extension groove 100. However, only the relatively small residual cross section remains via longitudinal groove 102 which is still open toward return chamber 68 and toward tank chamber 70. Floating-position control edge 94 is likewise ineffective in this position. Via longitudinal groove 102, a certain quantity of pressure medium therefore flows toward the tank; this partial flow is lost to the actual quick-action volumetric flow. The main portion of the pressure-medium volumetric flow flows from return chamber 68 via quick-action channel 46 and return valve 48, which then opens, into pressure-compensation outlet chamber 60, where it is added to the pressure-medium volumetric flow that flows from inlet chamber 64 via the metering-orifice cross section, which has been controlled open by metering-orifice control edge 88, to individual pressure compensator 28 and, from there, via curved channel 32 into pressure-compensator outlet chamber 60. This relatively great quick-action volumetric flow is then directed via the cross section that was controlled open by inlet control edge 86, forward-flow chamber 58, and consumer port A to cylindrical chamber 10 of lifting cylinder 14.

Due to the design of control edge 86 to include control windows having a flow area that is smaller than an entire flow area, it is made possible for such a pressure to build up in annular chamber 12 that the load does not drop in an uncontrolled manner, but rather that the speed of the load is specified by the quantity of pressure medium that is pumped by the pump. Due to control edge 86, the pressure decreases from the high pressure in annular chamber 12 to the lower pressure in cylindrical chamber 10.

The quantity of pressure fluid that is not useful for quick action and flows away via longitudinal groove 102 is dependent on the pressure in cylindrical chamber 12 of lifting cylinder 14.

As FIG. 4*c* also shows, in this position (E), end section 128 of the directional-control valve piston moves toward end face 142 of stop bolt 132, and this displacement of valve spool 52 initially takes place only against the force of centering spring 124—pressure point spring 130 has not yet contracted. This is the case because it is preloaded with a greater amount of force than is exerted by spring 124 in position (E).

Figure 4D:
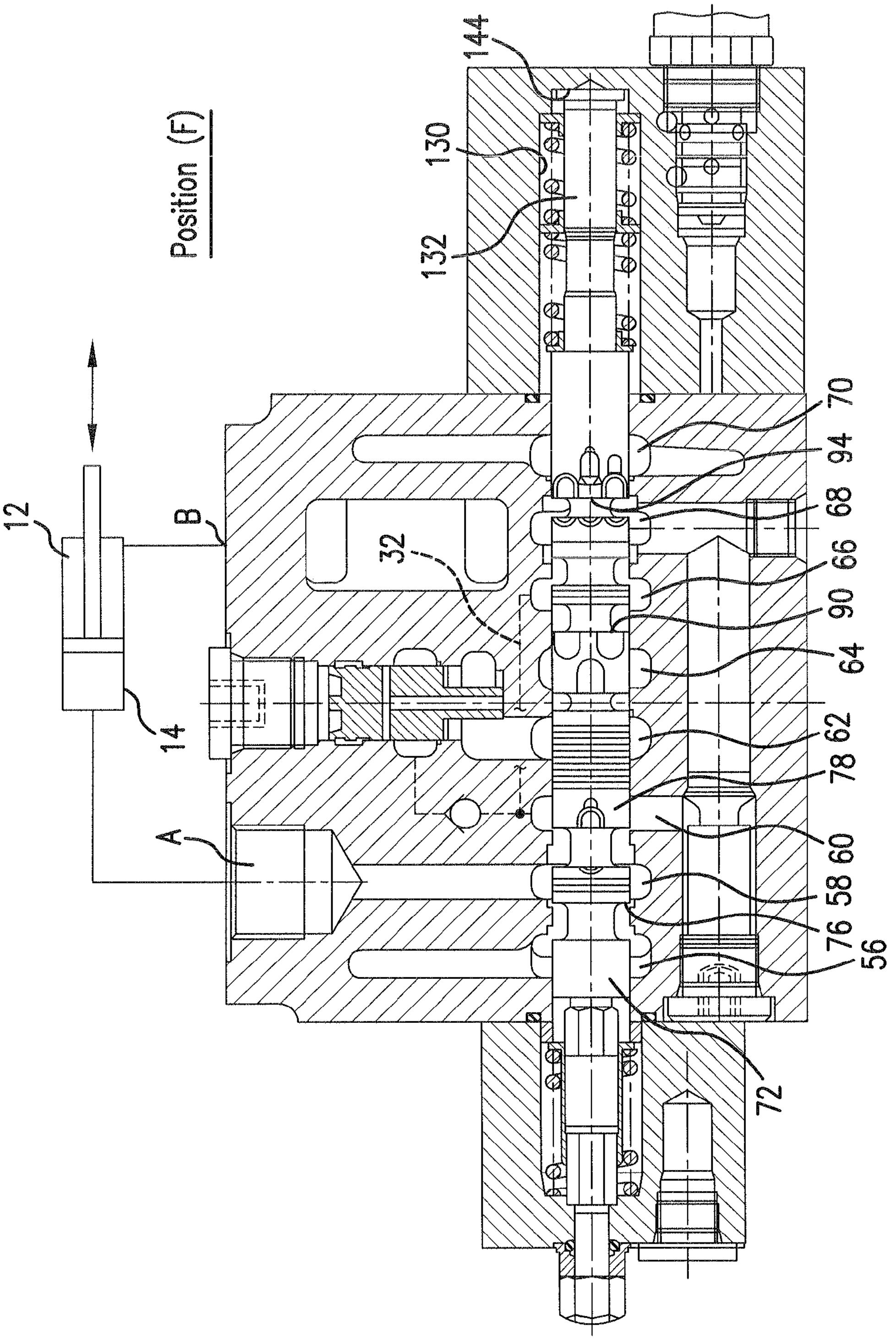

Valve spool 52 may then be displaced in the direction of floating position (F) only against the force of pressure point spring 130. Floating position (F) is shown in FIG. 4*d*. In this position, the connection between inlet chamber 64 and pressure-compensation inlet chamber 62 is blocked by the right—as shown in FIG. 4*d*—end section of inlet collar 78. However, inlet chamber 64 is connected in a throttled manner via metering-orifice control edge 90 to pressure-compensation outlet chamber 66 which is open toward return chamber 68. The latter is connected via floating-position control edge 94 to tank chamber 70, thereby enabling the pressure medium to flow from inlet chamber 64 to the tank. Accordingly, consumer port B is likewise connected via return chamber 68, floating-position control edge 94, and tank chamber 70 to the tank. The other consumer port A is likewise connected to the tank via forward-flow chamber 58 and tank chamber 56, which has therefore been controlled open via the annular groove between collars 72, 76, thereby enabling the dozer blade, in this floating position, to track uneven terrain or to flatten it using its weight. As explained above, floating position (F) may be attained only by overcoming the preload of pressure point spring 130, and therefore the operator receives clear feedback as to when floating position (F) has been reached. When pressure point spring 130 contracts, stop bolt 132 is driven by end section 128 of valve spool 52 until the right—as shown in FIG. 4*c*—end section of stop bolt 132 moves toward end stop 144. Further displacement toward the right is prevented.

In the above-described solution, valve spool 52 may be displaced into five positions in order to implement the functions “extend/retract lifting cylinder”, “quick action of the lifting cylinder”, “floating position of the lifting cylinder”, and “move to a neutral position”.

Disclosed herein is a valve system that includes a proportional directional valve, the valve spool of which may be displaced in the direction of five positions in order to activate a consumer in two directions, move it using quick action, operate a floating position, or block the pressure-medium connection to the consumer (neutral position).

What is claimed is:

1. A valve system for activating a hydraulic consumer (14), comprising:

a directional control valve (16) that includes a valve spool (52) that is guided in a valve bore and is moveable out of a neutral position (0) to establish a pressure medium connection between two consumer ports (A, B) and an inlet port (P) or an outlet port (T, T1);

a centering spring system (22), wherein in the neutral position (0), the valve spool (52) is preloaded via said centering spring system (22), wherein the valve spool (52) is displaceable in a direction of at least three further positions (H, A, F), wherein said at least three further positions (H, A, F) include a first position (H), wherein when said valve spool (52) is displaced into said first position (H) in a first direction, a pressure-medium flow path is controllable open between one of the consumer ports (B) and the inlet port (P), and between the other of the consumer ports (A) and the outlet port (T, T1);

a second position (A) in a second direction, wherein in said second position (A), a pressure-medium flow path is controllable open between the other consumer port (A) and the inlet port (P), and between the one consumer port (B) and the outlet port (T, T1); and a third, floating position (F), wherein in said third, floating position, the two consumer ports (A, B) are connected to the outlet port (T, T1), wherein, when displaced in the second direction, the valve spool (52) is moveable into a quick-action position (E), in which the pressure-medium volumetric flow, which flows away from the consumer (14) via the one consumer port (B), is added to the pressure-medium volumetric flow that flows from the inlet port (P) to the other consumer port (A), wherein the quick-action position (E) lies between the second position (A) and the third, floating position (F), and wherein the valve spool (52) is provided with a control edge (94), wherein when the valve spool (52) is displaced in the second direction, an opening cross section in the pressure-medium flow path between the one consumer port (B) and the outlet port (T, T1) is controllable open via the control edge (94), wherein an extension groove (100) is formed on the valve spool at a distance from the control edge (94), wherein an opening cross section between the one consumer (B) and the outlet port (T, T1) is controllable open when the valve spool (52) is displaced in the direction of the second position (A) via the extension groove (100), and wherein the opening cross section between the one consumer port (B) and the outlet port (T, T1) is controllable closed upon further displacement in the direction of the quick-action position (E) via the extension groove (100), wherein upon further displacement, the opening cross section in the pressure-medium flow path between the one consumer port (B) and the outlet port (T, T1) is controllable open using the control edge (94).

2. The valve system as recited in claim 1, wherein in the quick-action position (E), a residual cross section in the pressure-medium flow path between the one consumer port (B) and the outlet port (T, T1) is controlled open.

3. The control system as recited in claim 1, wherein when the valve spool (1) is displaced into the first position (H), an opening cross section between the inlet port (P) and the one consumer port (B) may be controlled open using the control edge (94).

4. The valve system as recited in claim 1 , wherein the extension groove (100) is a pocket, which is closed around the circumference, in the outer circumference of the valve spool.

5. The valve system as recited in claim 4, wherein a longitudinal groove (102) which determines the residual cross section is formed parallel to the extension groove (100).

6. The valve system as recited in claim 5, wherein the longitudinal groove (102) leads into a control window (96) of the control edge (94).

7. The valve system as recited in claim 5, wherein the effective flow cross section of the longitudinal groove (102) is smaller than that of the extension groove (100).

8. The valve system as recited in claim 1, wherein the centering spring system (22) includes two centering springs (116, 124), each of which is effective in one displacement direction, wherein a pressure-point spring (130) is assigned to the centering spring (124) that is effective opposite to the second direction and becomes operatively engaged when the valve spool (52) is displaced into the third, floating position (F).

9. The valve system as recited in claim 8 , wherein the centering spring (124) is supported on the pressure-point spring (130) which is acted upon by a preload that is greater than the centering spring (124).

10. The valve system as recited in claim 9, wherein the pressure-point spring (130) is loaded on a stop bolt (132) that is supported in an axially displaceable manner, and against which the valve spool moves upon displacement in the direction of the third, floating position (F).

11. The valve system as recited in claim 1, further comprising a quick-action channel (46), via which—when the valve spool (52) is displaced into the quick-action position (E) and the directional control valve (16) is circumvented—a return channel (38) that is connected to the one consumer port (B) is connected to an inlet-side inlet channel (32), wherein a return valve (48) that blocks in the direction toward the return channel (38) is provided in the quick-action channel (46).

12. The valve system as recited in claim 1, wherein the directional control valve (16) includes a direction part (20) and a speed part which is formed by a metering orifice (18), downstream of which an individual pressure compensator (28) is located, which is acted upon by a control pressure that corresponds to the highest load pressure of all consumers in order to reduce a pressure-scale opening cross section, and is acted upon by the pressure downstream of the metering orifice (18) to enlarge the pressure-scale opening cross section.

* * * * *